No. 680,667. Patented Aug. 13, 1901.
B. V. NORDBERG.
VALVE GEAR FOR ENGINES.
(Application filed Nov. 15, 1897.)
(No Model.) 4 Sheets—Sheet 1.

Witnesses:
Geo W Young
Chas L Goss

Inventor:
Bruno V. Nordberg
By Winkler Flanders Smith Bottum & Vilas
Attorneys

No. 680,667. Patented Aug. 13, 1901.
B. V. NORDBERG.
VALVE GEAR FOR ENGINES.
(Application filed Nov. 15, 1897.)

(No Model.) 4 Sheets—Sheet 2.

Witnesses:
Geo. W. Young.
Chas. L. Goss.

Inventor:
Bruno V. Nordberg,

No. 680,667. Patented Aug. 13, 1901.
B. V. NORDBERG.
VALVE GEAR FOR ENGINES.
(Application filed Nov. 15, 1897.)
(No Model.) 4 Sheets—Sheet 3.

Witnesses
Geo. W. Young.
Chas. L. Goss.

Inventor:
Bruno V. Nordberg,
Attorneys.

No. 680,667. Patented Aug. 13, 1901.
B. V. NORDBERG.
VALVE GEAR FOR ENGINES.
(Application filed Nov. 15, 1897.)
(No Model.) 4 Sheets—Sheet 4.
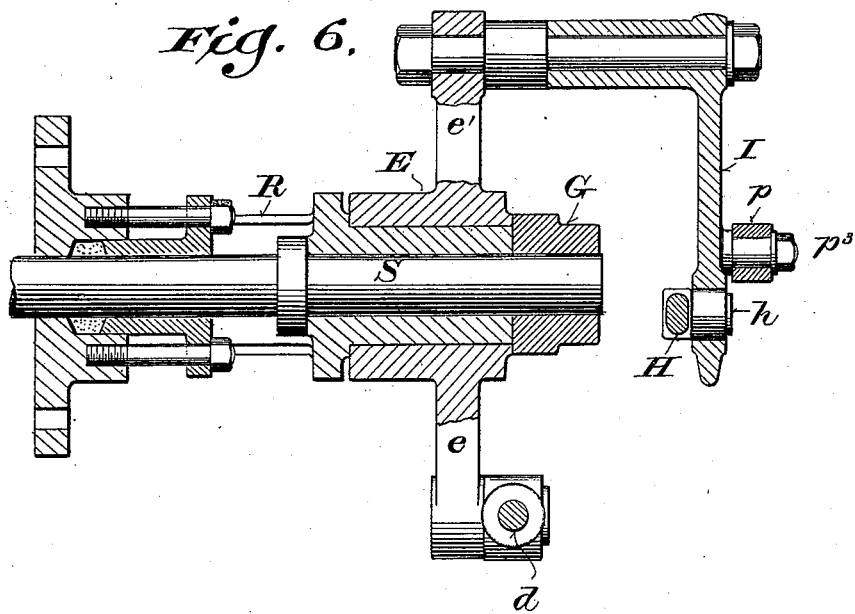
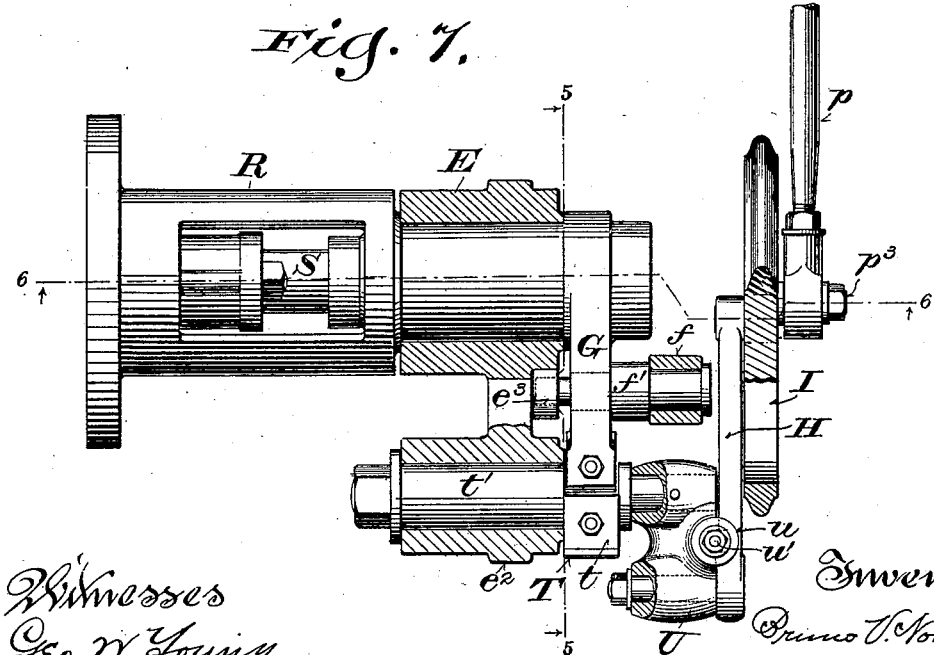

UNITED STATES PATENT OFFICE.

BRUNO V. NORDBERG, OF MILWAUKEE, WISCONSIN, ASSIGNOR TO NORDBERG MANUFACTURING COMPANY, OF WISCONSIN.

VALVE-GEAR FOR ENGINES.

SPECIFICATION forming part of Letters Patent No. 680,667, dated August 13, 1901.

Application filed November 15, 1897. Serial No. 658,581. (No model.)

*To all whom it may concern:*

Be it known that I, BRUNO V. NORDBERG, of Milwaukee, in the county of Milwaukee and State of Wisconsin, have invented certain new and useful Improvements in Valve-Gear for Engines; and I do hereby declare that the following is a full, clear, and exact description of the invention, which will enable others skilled in the art to which it pertains to make and use the same, reference being had to the accompanying drawings, and to the characters of reference marked thereon, which form a part of this specification.

My invention relates to variable-cut-off engines.

Its main objects are to increase the range of cut-off, to increase the speed, and generally to improve the construction and operation of engines of this class.

It consists of certain novel features in the construction and arrangement of component parts of the valve-gear and connections, as hereinafter particularly described, and pointed out in the claims.

In the accompanying drawings like characters designate the same parts in the several figures.

Figure 1:
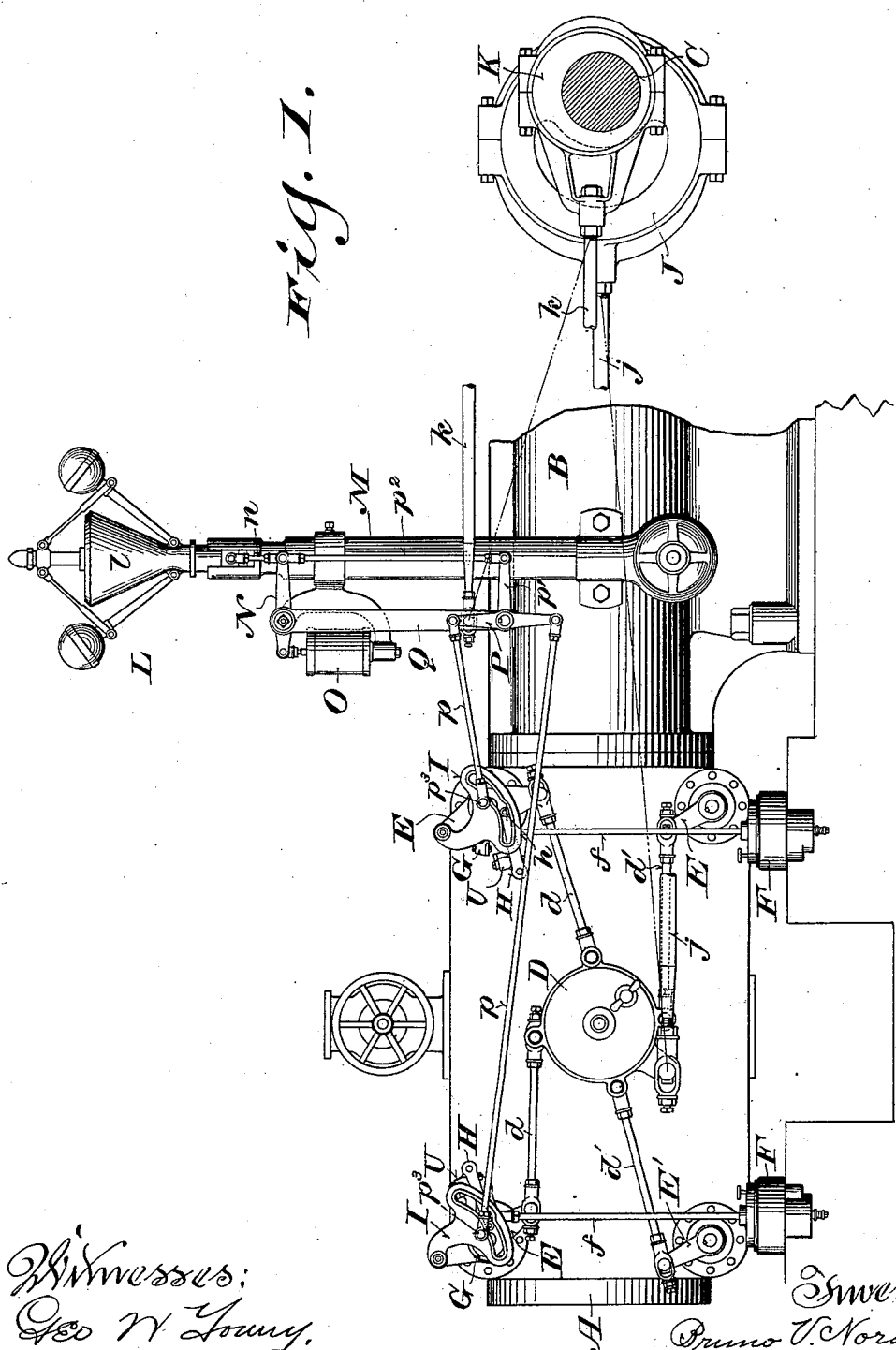
Figure 3:
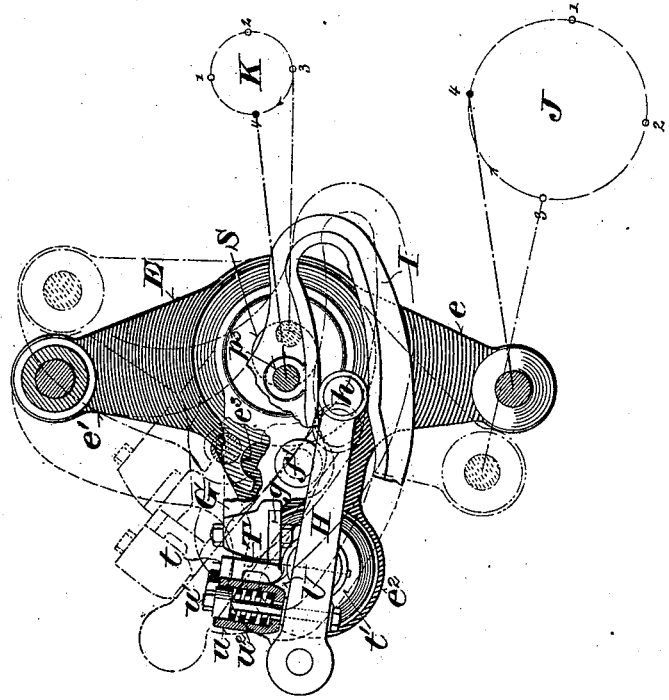
Figure 2:
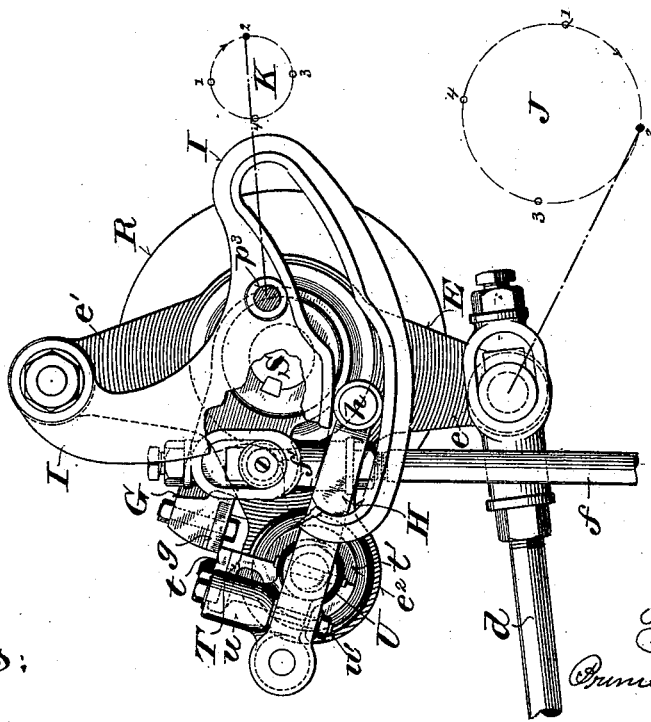
Figure 5:
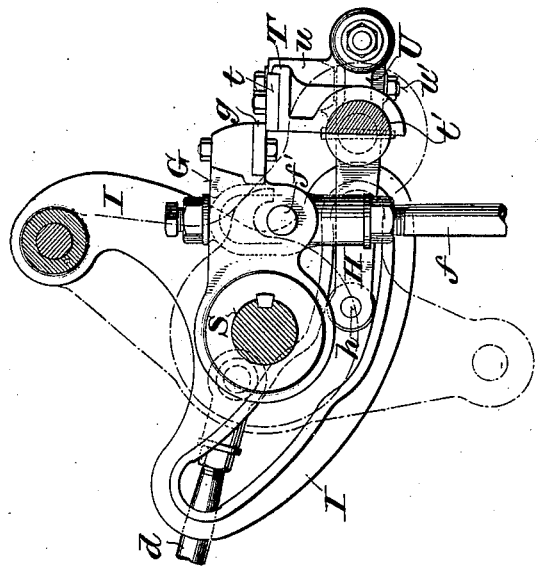
Figure 4:
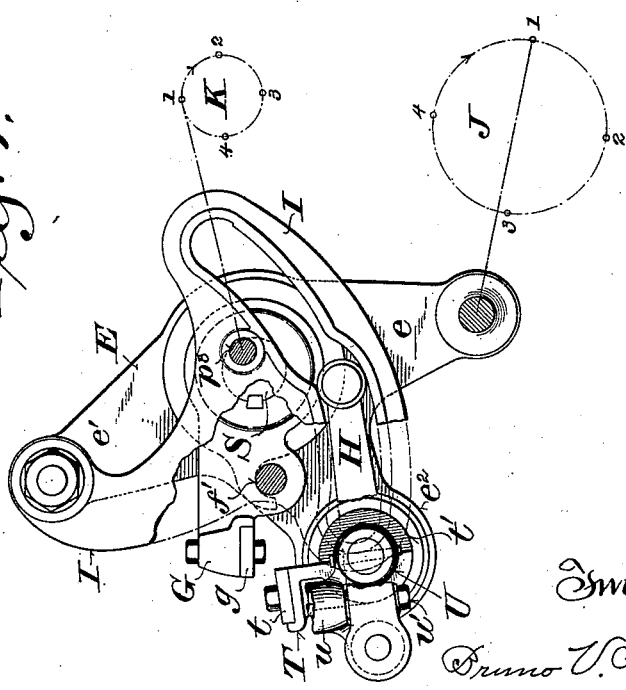

Figure 1 is a side elevation of a portion of a horizontal engine of the ordinary Corliss type, to which my improved valve-gear is applied, the crank-shaft being shown in cross-section and portions of the eccentric-rods broken away to admit of showing the eccentrics and cylinder in condensed space. Fig. 2 is a side elevation, on a greatly-enlarged scale, of that part of the gear immediately associated with the steam-valve at the crank end of the cylinder, showing the latch-blocks engaged in the operation of opening the valve. Fig. 3 is a similar view showing in full lines the same parts in released position for closing the valve and indicating by dotted lines the position of the parts just before cut-off. Fig. 4 is a similar view showing the parts in position for engagement of the latch-blocks just prior to opening the valve. Fig. 5 is a reverse view of a portion of the mechanism shown in Figs. 2, 3, and 4, being a section on the line 5 5, Fig. 7, showing the latch-blocks engaged for opening the valve. Fig. 6 is a vertical section indicated by the line 6 6, Fig. 7, of the valve mechanism lengthwise of one of the steam-valve stems; and Fig. 7 is a plan view, certain parts being broken away and shown in horizontal section. In Figs. 2, 3, and 4 the valve opening and releasing eccentrics are shown diagrammatically in connection with the valve-gear of one of the steam-valves.

In Corliss valve-gear as heretofore made the cut-off takes place according to variations in load and speed up to about four-tenths of the stroke of the piston; but if the load increases beyond that point the knock-off plates or cams are moved beyond the reach of the trip or latch arms, and the valves will not be released by the latch-blocks. Consequently from about four-tenths to full stroke of the piston the governor is unable to release the steam-valves and cut off steam from the cylinder at different points according to variations in the load. With my improved valve-gear the valves are released, according to the load and speed of the engine, at any point up to practically full stroke, the change in the point of cut-off toward the end of the stroke being gradual, as in the first part of the stroke, so that the most economical use of steam will be effected under all conditions, whether the engine is working with a heavy or light load. With my improved gear I am enabled to dispense with the springs which are commonly used to hold the latch or trip arms against the knock-off plates or cams and to run at much higher speeds than is practicable with the ordinary Corliss gear. My gear also runs, even at high speed, with less noise than the ordinary gear.

While I have shown for the purpose of illustration my gear in connection with an engine having rotary valves, it is applicable with little or no essential change to engines having other kinds of valves—such, for instance, as puppet-valves.

Referring to Fig. 1, A is the cylinder, B a portion of the frame, and C the crank-shaft, of a horizontal engine. D is the wrist-plate, connected by rods $d\ d$ with the steam-levers or opening-arms E E of the steam-valves and by rods $d'\ d'$ with arms E' E' on the stems of the exhaust-valves. F F are dash-pots connected by rods $f\ f$ with the drop-levers or valve-closing arms G G of the steam-valves. H H are trip-arms pivoted with latch-arms or blocks to the valve-opening arms E. I I are cams also pivoted to said valve-opening arms E and engaging crank pins or projections on said trip-arms. J is the main or valve-opening eccentric, mounted on the crank-shaft C and connected by a rod $j$ with the wrist-plate D in the usual or any suitable manner. K is an auxiliary or valve-releasing eccentric also mounted upon the crank-shaft and connected with the tripping-cams I, as hereinafter explained. L is a centrifugal governor, the shaft of which is supported in a standard M, attached to the engine-frame B. The counterpoise $l$ of the governor is connected by a link $n$ with the longer arm of a lever N, which is fulcrumed to a bracket on the standard M and is connected by its shorter arm with the piston of a cushion-cylinder O. P is a three-armed or T-shaped lever fulcrumed at the junction of its arms to the lower end of a swinging bar Q, which is pivoted at its upper end with the lever N to the same bracket or support. The vertically-disposed arms of the lever P are connected by rods $p$ $p$ with the tripping-cams I, and the horizontally-disposed arm $p'$ of said lever is connected by a rod $p^2$ with the longer arm of lever N, which, with the bar Q, arm $p'$ of lever P, and rod $p^2$, forms a jointed parallelogram. The bar Q is connected at or near its lower end by a rod $k$ with the strap of eccentric K.

Referring to Figs. 2 to 7, inclusive, the steam or valve-opening lever E has three arms $e$, $e'$, and $e^2$ and is formed with a sleeve, which is fitted to turn upon the bonnet R, through which the valve-stem S passes, and in which it has a bearing concentric with the bearing of said sleeve. The arm $e$ of said lever is connected by a rod $d$ with the wrist-plate, and to the arm $e'$ on the opposite side of the stem S is pivoted the cam I. Upon the outer end of the valve-stem S is fixed the drop-lever or valve-closing arm G, which is provided at the end on the under side with a trip-steel or latch-block $g$. The other latch-block, $t$, is attached to the upper end of an arm T on a rocker-pin $t'$, which is fitted to turn in a sleeve formed with the intermediate arm $e^2$ of lever E parallel with the valve-stem, as shown in Fig. 7. This rocker-pin $t'$ is cut away on the side toward the valve-stem next to the arm T, as shown is Fig. 5, to allow the end of the arm G to pass when the latch-blocks are disengaged and the valve is closed by the dash-pot rod $f$. The trip-arm H is connected at one end by a pivot-pin with a head U, which is fastened on the outer end of the rocker-pin $t'$, as shown in Figs. 4 and 7, and has a vertically-disposed socket $u$, overhanging the arm H and connected therewith by a bolt $u'$, between a head on the upper end of which and the bottom of said socket is interposed a spring $u^2$, as shown in Fig. 3, thus forming a yielding connection between said arm H and the arm T, carrying the latch-block $t$. The opposite end of the trip-arm H is provided with a crank-pin $h$, which projects into a slot in the cam I. This slot consists of two arc-shaped parts, each concentric with the pivot connection between said cam and the arm $e'$, and forming by its junction with the other a short incline or offset by which the trip-arm H is turned sufficiently to disengage the latch-block $t$ from the latch-block $g$. The distance of the pivot connection between the cam I and the arm $e'$ from the center of the pivot-pin $p^3$ is the same as its distance from the center of the valve-stem S, and the offset in the cam-groove is so located that when the pivot-pin $p^3$ is brought into line with the valve-stem said offset will engage the crank-pin $h$ of the trip-lever and disengage the latch-block $t$ from the latch-block $g$ or turn and hold the former out of range with the latter; but while said crank-pin traverses either part of said slot without passing the offset therein the position of the latch-arm T will not be changed with respect to the lever E. The slot in the cam into which the crank-pin $h$ of the trip-arm projects holds the latch-arm T and its latch-block $t$ positively in its proper relation to the lever E and to the trip-block $g$ on the arm G without the agency of a spring; but by supplying a spring for holding the trip-arm H or its crank-pin $h$ in engagement with the cam one of the parallel working faces of the cam on one side of the slot therein may be dispensed with. I prefer, however, the construction shown, as it avoids the necessity of using springs, and thus prevents the premature disengagement or uncertain engagement of the latch-blocks by centrifugal force incident to the use of such springs and admits of running at much higher speeds. It will be observed that the heads or nuts of the bolts by which the latch-blocks are secured to the arms G and T are exposed on the upper sides of said arms and are always accessible in whatever position or condition the valve-gear may be, whether running or at rest, thus enabling the engineer to tighten said bolts or nuts with a wrench in case they become loose or to adjust the latch-blocks without stopping the engine. It will also be noticed that the pivot-pin $f'$, by which the rod $f$ is attached to the arm G, is extended at its inner end into the path of a projection $e^3$ on the outer face of lever E, so that in case the dash-pot should for any reason fail to close the valve the return movement of the lever E will close it.

My improved valve-gear operates as follows: Assuming that the piston is at about the middle of its stroke, moving toward the crank-shaft, the steam or admission valve mechanism at the end of the cylinder toward which the piston is advancing will occupy the position shown in Fig. 4. The releasing-eccentric K is set with its greatest throw approximately in line with the engine-crank, and the valve-opening eccentric J is set with its greatest throw at an angle of approximately ninety degrees from said crank. In Fig. 4 the lever E is at the limit of its return movement after opening the valve, the cam I is at about the middle of its movement from left to right, and the latch-block $t$ is in position to engage the latch-block $g$ for opening the valve, the crank-pin $h$ of the trip-arm H being held in that part of the cam-slot farthest from its pivot. As the eccentric J turns from 1 to 2 the arm $e$ of lever E will be turned to the left, the arm $e^2$ turned upward, and the latch-block $t$ moved into engagement with the latch-block $g$, as shown in Figs. 2 and 5. During this movement of the eccentric J the eccentric K turns from 1 to 2, swinging the cam I to the right and carrying the offset in the cam-slot away from the crank-pin $h$, which traverses the part of the slot having the longest radius. The latch-blocks are thus held in engagement, and the arm G is turned upward or to the right with lever E, as shown in Fig. 2, and the valve is opened, the piston being at or near the end of its stroke toward the crank-shaft. In Fig. 2 the cam I has reached the limit of its movement by eccentric K to the right and from that point begins its return movement to the left. In turning from the position indicated in Fig. 2 to the position indicated by dotted lines in Fig. 3 the eccentric J turns the lever E to the extreme limit of its movement to the right, carrying with it the arm G as long as the latch-blocks remain in engagement. During the foregoing movement of the eccentric J the eccentric K has moved from position 2, as indicated in Fig. 2, to position 3, as indicated in Fig. 3, swinging the cam I to the left and carrying the offset in the cam-slot up to the crank-pin $h$ in position to turn the trip-arm H upward and throw the latch-block $t$ out of engagement with the latch-block $g$. From the position indicated by dotted lines in Fig. 3 the lever E and the cam I are turned in opposite directions, and a slight movement of the valve-gear under these conditions effects the instant disengagement of the latch-blocks and the consequent closing of the valve, the arm G being turned back to its initial position. (Shown by full lines in Fig. 3.) When the valve-gear is in the position indicated by dotted lines in Fig. 3, the piston is at about the middle of its return stroke from the crank end of the cylinder. As the piston completes its return stroke the eccentrics J and K turn from 3 to 4, as indicated in Fig. 3, carrying the cam I to the limit of its movement to the left and turning the lever E to about the middle of its movement from left to right. During this movement the crank-pin $h$ is held in that part of the cam-slot having the shorter radius, and the latch-arm T is consequently held by the trip-arm H out of the range or path of the arm G and its latch-block $g$. In making the next quarter of a revolution as the piston passes from the head end of the cylinder to about the middle of its stroke toward the crank-shaft the longer radii of the eccentrics J and K turn from 4 to 1, moving the parts of the gear from the positions in which they are shown in full lines in Fig. 3 to the positions in which they are shown in Fig. 4. During this movement the lever E is swung to the left from its middle to its extreme position, and the cam I is swung from its extreme position at the left to its middle position, carrying the offset in the slot by the crank-pin $h$ of the trip-arm just as the latch-block $t$ passes below the latch-block $g$, thus turning the latch-arm T to the right and moving the latch-block $t$ into position for engaging the latch-block $g$ when the lever E is next turned to the right. The movements of the steam-valve mechanism at the opposite or head end of the cylinder correspond, but alternate with those above explained. The eccentric K operates through the rod $k$ to swing the bar Q and the lever P back and forth without changing the angular adjustment of said lever, which is controlled by the governor L. An increase of speed causes the governor to raise the longer arm of lever N and to turn the lever P to the left, thus in effect lengthening the connection of the cam I at the crank end and shortening the connection of the cam I at the head end of the cylinder with the releasing-eccentric K and causing the offsets in the cam-slots to engage the crank-pins $h$ of the trip-levers H and to release the steam-valves earlier in the stroke of the piston. In like manner a decrease of speed causes the governor to lower the longer arm of lever N and to turn the lever P to the right, thereby shortening the eccentric connection of cam I at the crank end and lengthening the eccentric connection of the cam I at the head end of the cylinder. This causes said cams to release the steam-valves later in the stroke of the piston. A decrease of load to the minimum and a corresponding increase of speed will thus cause the governor to gradually turn the cams on their pivot connections with levers E toward each other until they will release the valves at the beginning of each stroke of the piston or prevent the engagement of the latch-blocks and the opening of said valves. In like manner an increase of load to the maximum and a corresponding decrease of speed will cause the governor to gradually turn the cams away from each other and gradually retard the release of the valves to or nearly to full stroke.

In case the valve-gear is improperly adjusted, as frequently occurs by changing the length of the dash-pot-connecting rod $f$, so that the arm T or latch-block $t$ does not clear the arm G or latch-block $g$ in passing below it, the arm T is allowed by the spring $u^2$ to yield in relation to the trip-arm H, which is rigidly held by the cam I, and the breaking or injury of the mechanism is thus prevented.

In place of the swinging bar Q or the jointed parallelogram of which it is a part any other support for lever P, movable toward and from the cams I, may be employed. The eccentrics J and K may be mounted on any convenient part of the engine which turns isochronously with the crank-shaft. With the low and intermediate pressure cylinders of multiple-expansion engines and with pumping or other engines in which a variable automatic cut-off is undesirable the governor connection, with the trip mechanism of the steam-valves, is dispensed with, and in its place provision is made for manually adjusting the angle of lever P, as occasion may require. In short, various changes in the details of construction and arrangement shown in the drawings and hereinbefore described may be made without departure from the spirit and intended scope of my invention.

I claim—

1. In valve-gear for engines the combination with valve-operating arms provided with latch-blocks, of tripping mechanism comprising a cam pivoted to one of said arms, and an eccentric connected with said cam, substantially as and for the purposes set forth.

2. In valve-gear for engines the combination with valve-operating arms provided with latch-blocks, one of which is movable into and out of range with the other, and an eccentric connected with the arm having the latch-block movably connected therewith, of tripping mechanism comprising a cam pivoted to the arm having the movable latch-block, and a releasing-eccentric connected with said cam, substantially as and for the purposes set forth.

3. In valve-gear for engines the combination with valve-operating arms, of tripping mechanism comprising a cam pivoted to one of said arms, an eccentric connected with said cam, and a governor arranged to regulate the connection between said eccentric and cam, substantially as and for the purposes set forth.

4. In valve-gear for engines the combination with valve-operating arms provided with latch-blocks and an eccentric connected with one of said arms for opening the valve, of a cam carried by the valve-opening arm for disengaging said latch-blocks, another eccentric connected with said cam for releasing the valve, and a governor for regulating the connection between said cam and the releasing-eccentric, substantially as and for the purposes set forth.

5. In valve-gear for engines the combination with a valve-opening arm provided with a trip-arm pivoted thereto, of a releasing-cam pivoted to said valve-opening arm and having a bearing which engages the trip-arm and consists of two arcs described from the pivot of the cam with different radii and connected by an incline or offset, substantially as and for the purposes set forth.

6. In valve-gear for engines the combination with valve-operating arms provided with latch-blocks, one of which is movable into and out of range with the other and is provided with a trip-arm, of a cam pivoted to the arm having the movable latch-block, and provided with a bearing composed of two arcs of different radii concentric with the pivot connection between said cam and arm and connected by an incline or offset which is adapted by engagement with said trip-arm to throw the latch-block connected therewith out of engagement with the latch-block of the other arm, substantially as and for the purposes set forth.

7. In valve-gear for engines the combination with valve-operating arms, of a trip-arm pivoted to one of said arms, a cam pivoted to said arm at a distance from the axis on which it turns, and adapted to engage with said trip-arm, and an eccentric connected with said cam at a distance from its pivot equal to the distance of said pivot from the axis of said arm, substantially as and for the purposes set forth.

8. In valve-gear for engines the combination with a valve-operating arm, of a trip-arm pivoted thereto, a cam also pivoted to said valve-operating arm at a distance from the axis on which the latter turns and adapted to engage with said trip-arm, and an eccentric having an adjustable connection with said cam for varying the point of cut-off, substantially as and for the purposes set forth.

9. In valve-gear for engines the combination with a valve-operating arm, of a trip-arm pivoted thereto, a cam also pivoted to said valve-operating arm and adapted to engage with said trip-arm, a lever-arm connected with said cam and carried by a movable support, an eccentric connected with said lever-support, and means for adjusting said lever-arm to vary the point of cut-off, substantially as and for the purposes set forth.

10. In valve-gear for engines the combination with a valve-operating arm, of a trip-arm pivoted thereto, a cam also pivoted to said valve-operating arm and adapted to engage with said trip-arm, a lever-arm connected with said cam and carried by a movable support, an eccentric connected with said movable support, and a governor connected with said lever-arm for automatically varying the point of cut-off, substantially as and for the purposes set forth.

11. In valve-gear for engines the combination with valve-operating arms, of trip-arms pivoted thereto, cams also pivoted to said valve-operating arms and adapted to engage said trip-arms, a three-armed lever having two of its arms connected with said cams, and carried by a jointed parallelogram, of which the third arm of said lever constitutes a side, an eccentric connected with said parallelogram and means for adjusting said parallelogram to vary the point of cut-off, substantially as and for the purposes set forth.

12. In valve-gear for engines the combination with a valve-operating arm, of a latch-arm pivoted thereto, a cam also pivoted to said valve-operating arm, and formed with a slot which has an offset between two arc-shaped portions each concentric with the pivot connection between said cam and valve-operating arm, and a trip-arm yieldingly connected with said latch-arm and having a crank-pin or projection engaging the slot in the valve-operating arm, substantially as and for the purposes set forth.

13. In valve-gear for engines the combination with valve-operating arms provided with latch-blocks, one of which is movable into and out of range with the other, of a trip-arm yieldingly connected with the movable latch-block and having an unyielding actuating or adjusting connection, substantially as and for the purposes set forth.

In testimony that I claim the foregoing as my own I affix my signature in presence of two witnesses.

BRUNO V. NORDBERG.

Witnesses:
   CHAS. L. GOSS,
   GEO. P. DRAVO.